(12) United States Patent
Kim et al.

(10) Patent No.: US 9,946,403 B2
(45) Date of Patent: Apr. 17, 2018

(54) DISPLAY DEVICE, METHOD FOR DRIVING THE SAME, AND DRIVING CIRCUIT THEREOF

(71) Applicant: LG Display Co., Ltd., Seoul (KR)

(72) Inventors: Sungchul Kim, Goyang-si (KR); Hyunguk Jang, Paju-si (KR); Sanghyuck Bae, Paju-si (KR); Sungsu Han, Goyang-si (KR); Suyun Ju, Gangwon-do (KR); Doyoung Jung, Seoul (KR); Kyungjin Jang, Seoul (KR); Yoonion Hwang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/984,740

(22) Filed: Dec. 30, 2015

(65) Prior Publication Data
US 2017/0060337 A1     Mar. 2, 2017

(30) Foreign Application Priority Data

Aug. 31, 2015  (KR) .................. 10-2015-0123263
Dec. 28, 2015  (KR) .................. 10-2015-0187202

(51) Int. Cl.
| | |
|---|---|
| *G06F 3/045* | (2006.01) |
| *G06F 3/041* | (2006.01) |
| *G06F 3/044* | (2006.01) |
| *G06F 3/0354* | (2013.01) |

(52) U.S. Cl.
CPC ........ *G06F 3/0418* (2013.01); *G06F 3/03545* (2013.01); *G06F 3/044* (2013.01); *G06F 3/0412* (2013.01)

(58) Field of Classification Search
CPC ............................................ G06F 3/041–3/047
See application file for complete search history.

(56) References Cited

U.S. PATENT DOCUMENTS

| | | | |
|---|---|---|---|
| 2014/0062907 A1* | 3/2014 | Kim ................... | G06F 3/038 345/173 |
| 2014/0152617 A1 | 6/2014 | Kida et al. | |
| 2014/0253498 A1 | 9/2014 | Suzuki et al. | |

(Continued)

FOREIGN PATENT DOCUMENTS

EP    2570896 A1    3/2013

OTHER PUBLICATIONS

European Extended Search Report, European Application No. 15203146.4, dated Dec. 22, 2016, 8 pages.

*Primary Examiner* — Hang Lin
(74) *Attorney, Agent, or Firm* — Fenwick & West LLP

(57) ABSTRACT

A touch sensitive display device, a method for driving the same, and a driving circuit of the display device are disclosed. The touch sensitive display device comprises a display panel comprising a plurality of pixels and a plurality of touch sensors. Each touch sensor is connected to at least one respective pixel of the pixels, the display panel driven in a plurality of successive display frame periods and during each display frame period a respective frame of image data is driven to the pixels. A touch driving circuit drives touch driving signals to the touch sensors during a touch frame that begins in a first display frame period of the display frame periods and ends in a second display frame period of the display frame periods that immediately follows the first display frame period.

24 Claims, 20 Drawing Sheets

(56) References Cited

U.S. PATENT DOCUMENTS

2014/0333546 A1* 11/2014 Chang .................... G06F 3/041
 345/173
2015/0035766 A1 2/2015 Chung
2015/0130747 A1 5/2015 Tsai

* cited by examiner

DISPLAY DEVICE, METHOD FOR DRIVING THE SAME, AND DRIVING CIRCUIT THEREOF

CROSS REFERENCE TO RELATED APPLICATIONS

This application claims the benefit of Republic of Korea Patent Application No. 10-2015-0123263 filed on Aug. 31, 2015 and Republic of Korea Patent Application No. 10-2015-0187202 filed on Dec. 28, 2015 both of which are incorporated herein by reference for all purposes as if fully set forth herein.

BACKGROUND

Field of the Invention

The present disclosure relates to a display device capable of performing a touch sensing, a method for driving the same, and a driving circuit of the display device.

Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

The touch UI has been necessarily adopted to portable information appliances. The touch UI is implemented by forming a touch screen on the screen of a display device. The touch screen may be implemented as a capacitive touch screen. The touch screen having capacitive touch sensors senses changes (i.e., changes in charges of the touch sensor) in a capacitance resulting from an input of a touch driving signal when a user touches (or approaches) the touch sensor with his or her finger or a conductive material, and thus detects a touch input.

In order to increase touch sensitivity of the capacitive touch screen the user feels, it is necessary to increase a touch report rate. This is because coordinates of the touch input are updated using a frequency of the touch report rate in a host system. Thus, a response time of the host system in response to the touch input is proportional to the touch report rate.

In an in-cell touch sensor technology in which the touch sensors of the touch screen are embedded in a pixel array of a display panel, because one display frame period is time-divided into a display period and a touch period, it is difficult to improve the touch report rate. In the in-cell touch sensor technology, the touch report rate is generally set to be the same as a display frame rate. The touch report rate indicates a frequency at which coordinate data obtained by sensing all of the touch sensors included in the touch screen is transmitted to the external host system. The display frame rate indicates a frequency at which all of pixels of the display panel are updated to new data. As the touch report rate increases, a time required to update coordinates of the touch input is reduced. Therefore, the touch sensitivity of the touch screen the user feels can be improved, and a touch input trace can be represented in detail. However, because a related art recognizes the touch input at the touch report rate, which is set to be the same as the display frame rate, it is difficult to implement the fast response of the touch input.

For example, in case of a fast moving line drawn by a finger, the slow response of the touch input may cause an increase in a distance between successively recognized coordinate points. Hence, the related art may recognize a line of a shape different from a representation of a curved line the user draws.

In order to increase the touch report rate in the in-cell touch sensor technology, as shown in FIG. 1, a method for assigning a plurality of touch frames TF1 and TF2 to one display frame period has been proposed. In FIG. 1, M01 to M14 denote multiplexers used to sequentially sense touch blocks of a touch screen. Each touch block includes a plurality of touch sensors. Each of the touch frames TF1 and TF2 includes a plurality of touch periods respectively corresponding to the multiplexers M01 to M14. One touch frame indicates a cycle, in which a touch report is output. The multiplexers M01 to M14 are sequentially turned on in the touch periods. The touch periods occur when the touch enable signal TEN has a low logic level. Hence, a sensing unit sequentially sense changes in capacitances of the touch sensors through the multiplexers M01 to M14 on a per block basis. During one touch frame TF, each of the multiplexers M01 to M14 is used to perform a sensing operation once. Therefore, as shown in FIG. 1, when the two touch frames TF1 and TF2 are assigned to one display frame period, each of the multiplexers M01 to M14 is used to perform sensing operations twice.

However, in the related art in-cell touch sensor technology, a surplus period TD unusable as the touch period is produced in one display frame period. Because a length of the surplus period TD is shorter than a length of one touch frame, the surplus period TD is not used as the touch period. A reason why the surplus period TD is produced is because the touch report rate, which is integer times higher than the display frame rate, was implemented in the related art in-cell touch sensor technology.

The surplus period TD is necessarily produced in each display frame period. Hence, the related art in-cell touch sensor technology had a limit to an increase in the touch report rate because of the surplus period TD.

SUMMARY

The present disclosure provides a display device, a method for driving the same, and a driving circuit of the display device capable of improving a touch report rate by removing a surplus period unusable as a touch period in one display frame period.

In one aspect, there is a display device comprising a display panel including a pixel array, in which touch sensors are embedded, and a touch driving device configured to drive the touch sensors during a touch period and assign at least two touch frames each including the touch period to one display frame period, in which an input image is displayed, wherein a first period required to reach a first touch report time of a Kth display frame period from a start time point of the Kth display frame period is different from a second period required to reach a first touch report time of a (K+1)th display frame period from a start time point of the (K+1)th display frame period, where K is a positive integer.

The touch driving device is configured to increase a touch report rate so that the touch report rate is non-integer times higher than a display frame rate.

The touch driving device is configured to further assign at least one dummy touch period to the one display frame period. The at least dummy touch period is positioned between adjacent touch frames.

The touch driving device is configured to supply a touch driving signal having a first driving frequency to some of the touch sensors during the dummy touch period to obtain a first touch sensing value, change a driving frequency of the touch driving signal to a second driving frequency different from the first driving frequency when a noise level of the first touch sensing value exceeds a predetermined reference value, and apply a touch driving signal having the second driving frequency to a touch frame following the dummy touch period.

The touch driving device is configured to store a first touch sensing value obtained by supplying a touch driving signal having a first driving frequency to some of the touch sensors in a first touch frame prior to the dummy touch period, supply a touch driving signal having a second driving frequency different from the first driving frequency to some of the touch sensors during the dummy touch period to obtain a second touch sensing value, compare a noise level of the first touch sensing value with a noise level of the second touch sensing value, and apply the touch driving signal having one of the first and second driving frequencies, of which the noise level is less than the other, to a second touch frame following the dummy touch period.

In another aspect, there is a driving circuit of a display device driving touch sensors embedded in a display panel during a touch driving period and assigning at least two touch frames each including the touch period to one display frame period, in which an input image is displayed, wherein a first period required to reach a first touch report time of a Kth display frame period from a start time point of the Kth display frame period is different from a second period required to reach a first touch report time of a (K+1)th display frame period from a start time point of the (K+1)th display frame period, where K is a positive integer.

In yet another aspect, there is a method for driving a display device including a display panel including a pixel array, in which touch sensors are embedded, the method comprising driving the touch sensors in response to a touch enable signal during a touch period, and assigning at least two touch frames each including the touch period to one display frame period, in which an input image is displayed, wherein a first period required to reach a first touch report time of a Kth display frame period from a start time point of the Kth display frame period is different from a second period required to reach a first touch report time of a (K+1)th display frame period from a start time point of the (K+1)th display frame period, where K is a positive integer.

In one embodiment, a touch sensitive display device comprises a display panel comprising a plurality of pixels and a plurality of touch sensors. Each touch sensor is connected to at least one respective pixel of the pixels, the display panel driven in a plurality of successive display frame periods and during each display frame period a respective frame of image data is driven to the pixels. A touch driving circuit drives touch driving signals to the touch sensors during a touch frame that begins in a first display frame period of the display frame periods and ends in a second display frame period of the display frame periods that immediately follows the first display frame period.

In one embodiment, the touch driving circuit drives touch driving signals to the touch sensors during the touch frame by driving touch driving signals to a first subset of the touch sensors during the first display frame period; driving touch driving signals to a second subset of the touch sensors during the second display frame period; and generating a touch report describing coordinates of a touch based on the touch driving signals driven to the first subset of the touch sensors during the first display frame period and also based on the touch driving signals driven to the second subset of the touch sensors during the second display frame period.

In one embodiment, the touch driving circuit generates a first touch report in the first display frame period. The first touch report is generated following a start of the first display frame period without any intervening touch reports being generated between the start of the first display frame period and the first touch report. The touch driving device also generates a second touch report in the second display frame period. The second touch report is generated based on the touch driving signals provided to the touch sensors during the touch frame. The second touch report is generated following a start of the second display frame period without any intervening touch reports being generated between the start of the first display frame period and the first touch report. A first time interval between the start of the first display frame period and the first touch report is different than a second time interval between the start of the second display frame period and the second touch report.

In embodiment, a touch report rate of the touch driving circuit is non-integer times higher than a frame rate of the display device.

In one embodiment, the touch driving circuit is configured to further assign at least one dummy touch period to the each display frame period, wherein the at least dummy touch period is positioned between adjacent touch frames.

In one embodiment, the touch driving circuit supplies a touch driving signal having a first driving frequency to one or more of the touch sensors during a dummy touch period of the first display frame period to obtain a first touch sensing value, the touch driving circuit not producing any touch report based on the touch sensing value obtained during the dummy touch period. The touch driving circuit also changes a driving frequency of the touch driving signal to a second driving frequency different from the first driving frequency responsive to a noise level of the first touch sensing value exceeding a predetermined reference value.

In one embodiment, the touch driving circuit obtains a first touch sensing value by supplying a touch driving signal having a first driving frequency to one or more of the touch sensors prior to a dummy touch period of the first display frame period. The touch driving circuit supplies a touch driving signal having a second driving frequency different from the first driving frequency to the one or more touch sensors during the dummy touch period to obtain a second touch sensing value, the touch driving circuit not producing any touch report based on the second touch sensing value obtained during the dummy touch period. The touch driving circuit also compares a noise level of the first touch sensing value with a noise level of the second touch sensing value, and selects between the first driving frequency and the second driving frequency based on the comparison.

In one embodiment, the touch driving circuit outputs touch driving pulses and dummy pulses to at one or more of the touch sensors, the dummy pulses having different characteristics than the touch driving pulses and being outputted in the at least one dummy touch period. The touch driving circuit also receives a signal from a stylus pen, the stylus pen differentiating between the touch driving pulses and the dummy pulses, the signal from the stylus pen synchronized with the touch driving pulses.

Other embodiments include a method operation in a display device, and a driving circuit for the display device. The driving circuit comprises a data driving circuit to drive the display panel in a plurality of successive display frame periods, wherein during each display frame period a respective frame of image data is driven to the pixels. The driving circuit also comprises a touch driving circuit to drive touch driving signals to the touch sensors during a touch frame that begins in a first display frame period of the display frame periods and ends in a second display frame period of the display frame periods that immediately follows the first display frame period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
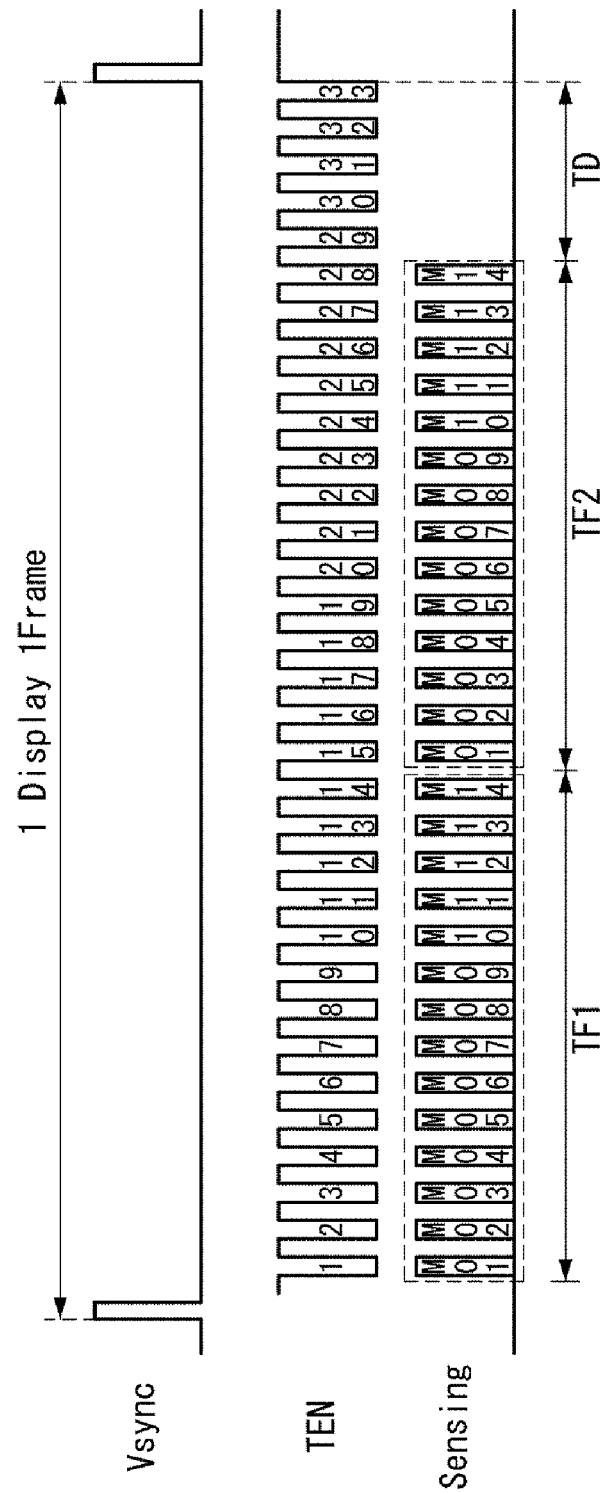
FIG. 1 shows a surplus period unusable as a touch period among one display period in a related art in-cell touch sensor technology.
Figure 2:
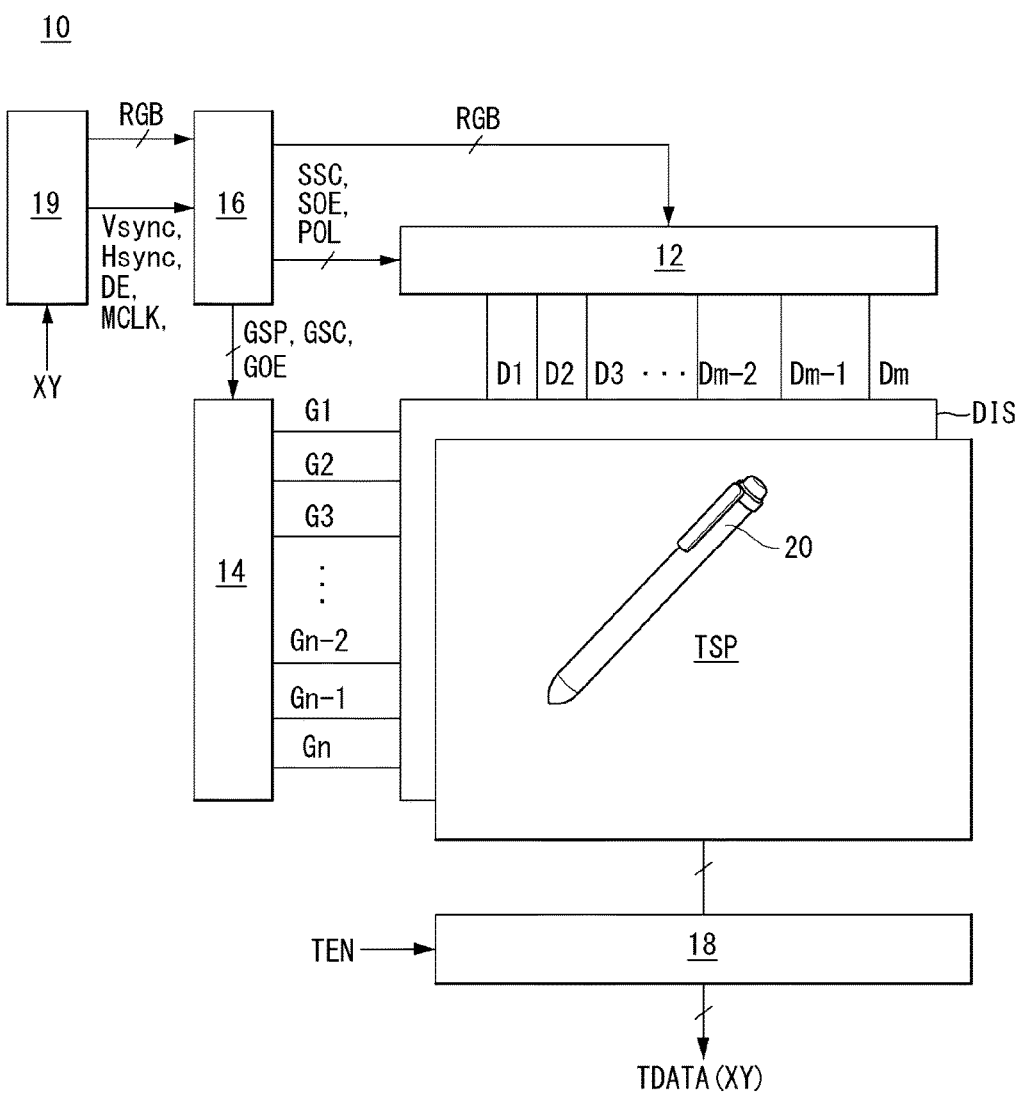
FIG. 2 shows a touch sensitive display device according to an exemplary embodiment of the invention.
Figure 3:
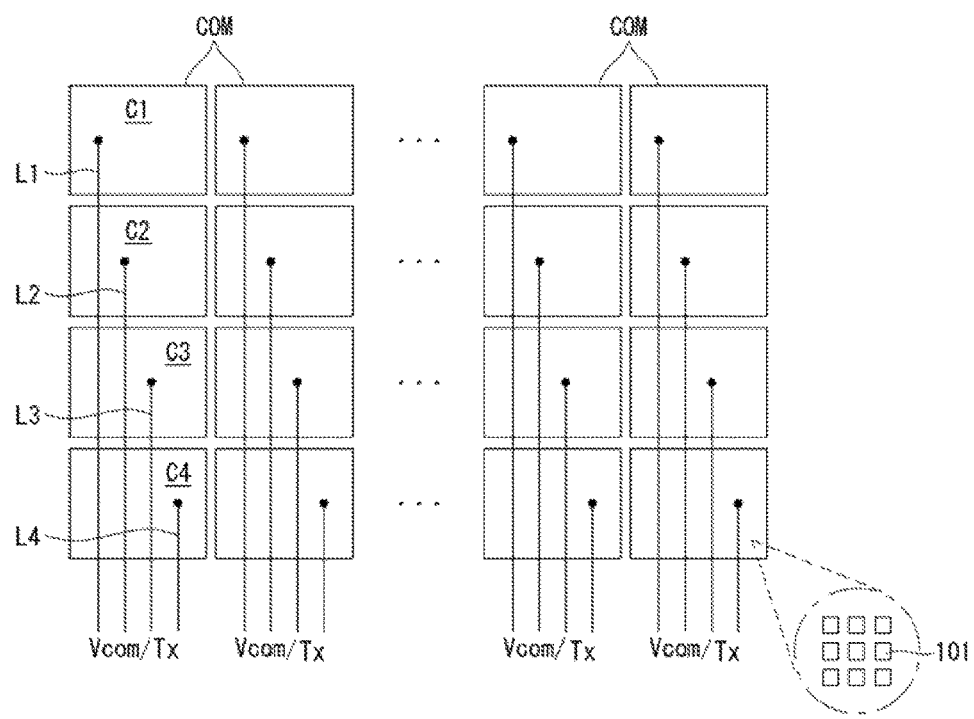
FIG. 3 shows an example of a touch sensor embedded in a pixel array.
Figure 4:
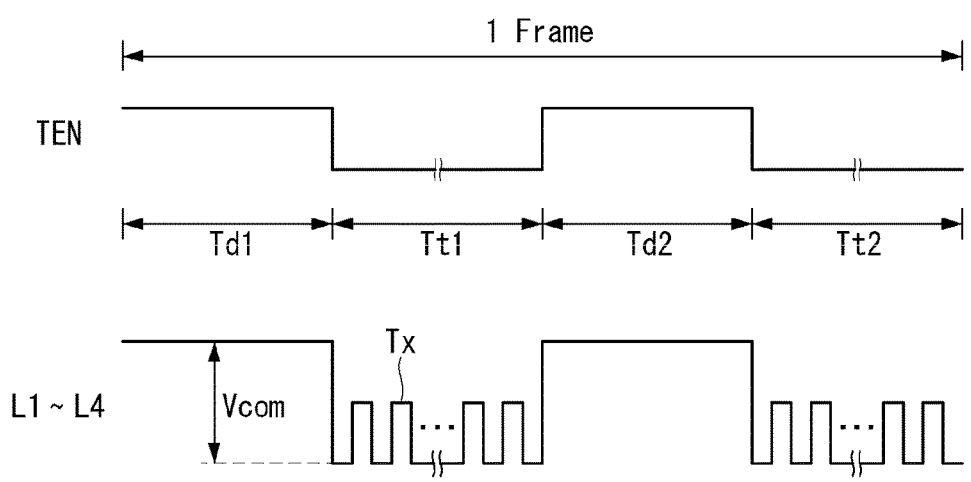
FIG. 4 is a timing diagram showing a method for time-division driving pixels of a display panel and touch sensors shown in FIG. 3.
Figure 5:
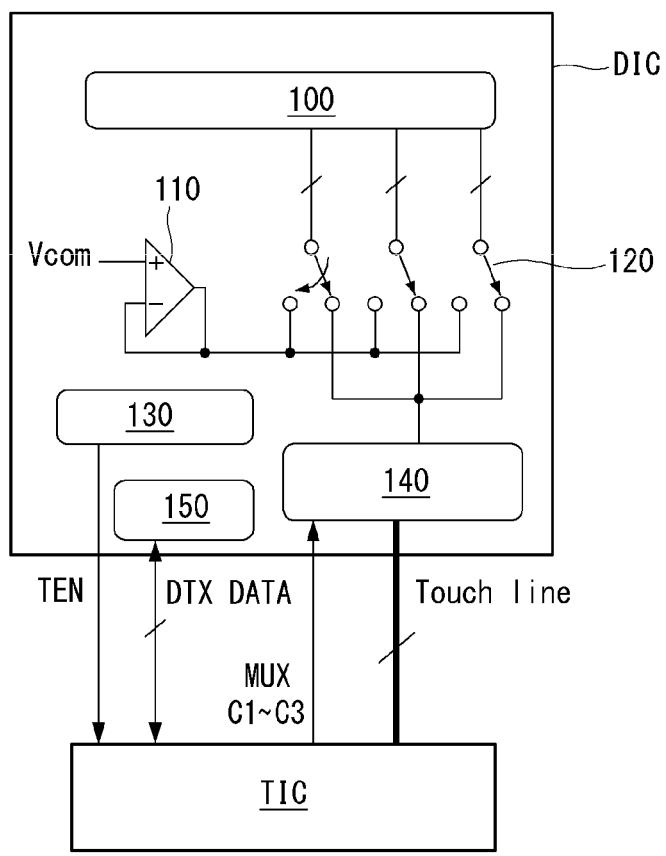
FIGS. 5 to 7 show a touch driving device according to an exemplary embodiment of the invention.
Figure 6:
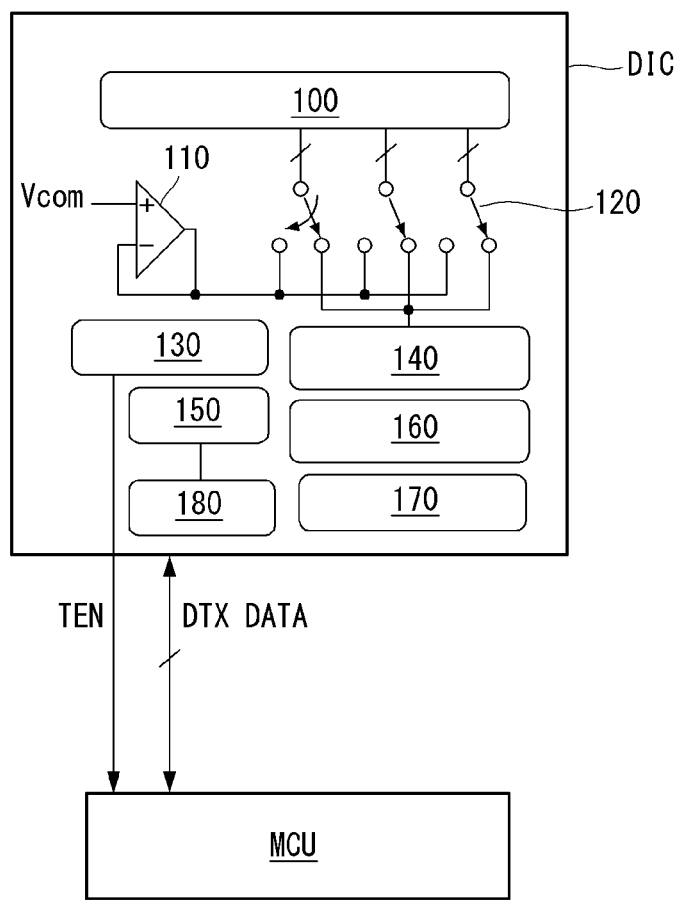
Figure 7:
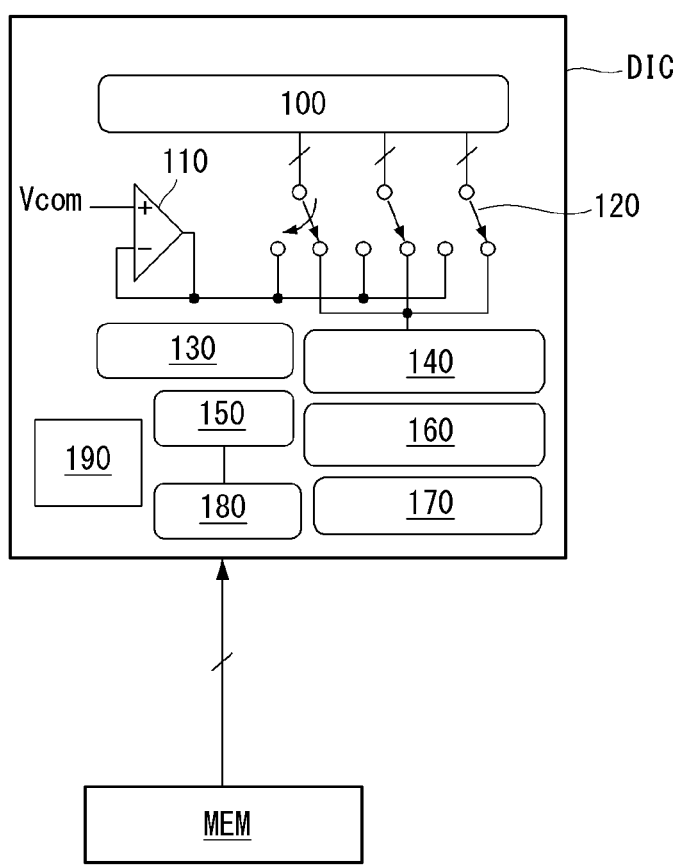
Figure 8:
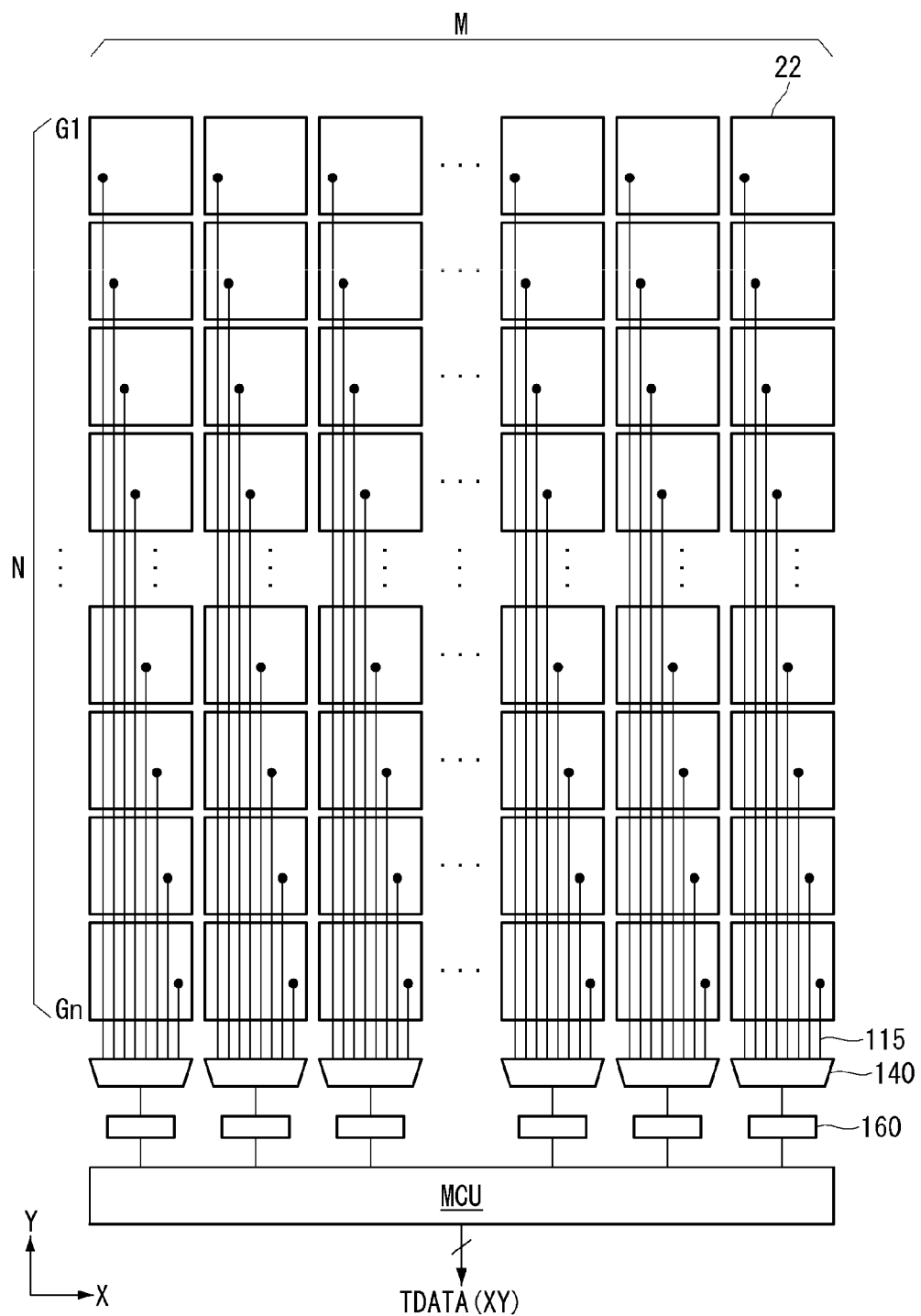
FIG. 8 shows multiplexers connected to touch sensor blocks and sensing units.

FIG. 2 shows a display device including a touch driving device according to an exemplary embodiment of the invention. FIG. 3 shows an example of a touch sensor embedded in a pixel array. FIG. 4 shows a method for time-division driving pixels of a display panel and touch sensors shown in FIG. 3. FIGS. 5 to 7 show a touch driving device according to an exemplary embodiment of the invention. FIG. 8 shows multiplexers connected to touch sensor blocks and sensing units.

Referring to FIGS. 2 to 8, a display device 10 according to the embodiment of the invention may be implemented based on a flat panel display, such as a liquid crystal display (LCD), a field emission display (FED), a plasma display panel (PDP), an organic light emitting diode display, and an electrophoresis display (EPD). In the following description, the embodiment of the invention will be described using the liquid crystal display as an example of the flat panel display. Other flat panel displays may be used.

The display device 10 includes a display module and a touch module.

The touch module includes a touch screen TSP and a touch driving device 18.

The touch screen TSP may be implemented through a capacitive manner of sensing a touch input through a plurality of capacitive sensors. The touch screen TSP includes a plurality of touch sensors each having a capacitance. The capacitance may be divided into a self-capacitance and a mutual capacitance. The self-capacitance may be formed along a conductor line of a single layer formed in one direction, and the mutual capacitance may be formed between two conductor lines perpendicular to each other.

The touch sensors of the touch screen TSP may be embedded in a pixel array of a display panel DIS. FIG. 3 shows an example of embedding the touch screen TSP in the pixel array of the display panel DIS. Referring to FIG. 3, the pixel array of the display panel DIS includes touch sensors C1 to C4 and sensor lines L1 to Li connected to the touch sensors C1 to C4, where "i" is a positive integer. A common electrode COM of a plurality of pixels 101 is divided into a plurality of segments. The touch sensors C1 to C4 are implemented as the divided common electrodes COM. One common electrode segment is commonly connected to the plurality of pixels 101 and forms one touch sensor. The touch sensor serves as a display electrode of the pixels 101. Thus, as shown in FIG. 4, the touch sensors C1 to C4 supply a common voltage Vcom to the pixels 101 during display periods Td1 and Td2 for image display. During touch periods Tt1 and Tt2, the touch sensors C1 to C4 receive a touch driving signal Tx and sense a touch input. FIG. 3 shows the self-capacitance touch sensors, as an example. Other types of touch sensors may be used for the touch sensors C1 to C4.

The touch driving device 18 applies the touch driving signal Tx to the touch sensors C1 to C4 and senses a change in charges of the touch sensors C1 to C4 before and after a touch operation. Hence, the touch driving device 18 determines whether or not the touch operation using a conductive material, for example, a finger (or a stylus pen) is performed and a location of the touch operation.

The touch driving device 18 drives the touch sensors in response to a touch enable signal TEN received from a timing controller 16 or a host system 19 during the touch periods Tt1 and Tt2. During the touch periods Tt1 and Tt2, the touch driving device 18 supplies the touch driving signal Tx to the touch sensors C1 to C4 through the sensor lines L1 to Li and senses the touch input. The touch driving device 18 analyzes the change in the charges of the touch sensor, determines whether or not the touch input is received, and calculates coordinates of a location of the touch input. The coordinates of the location of the touch input are transmitted to the host system 19 in the form of a touch report. A rate at which the touch report is output is the touch report rate.

The touch driving device 18 drives the touch sensors C1 to C4 in response to the touch enable signal TEN during the touch periods Tt1 and Tt2 and assigns at least two touch frames for driving the touch sensors C1 to C4 to one display frame period displaying an input image, thereby further increasing a touch report rate compared to a display frame rate. In the embodiment disclosed herein, one touch frame may include a plurality of touch periods corresponding to the number of multiplexers.

For example, as shown in FIG. 4, when the display period and the touch period in one display frame period are divided into the plurality of display periods Td1 and Td2 and the plurality of touch periods Tt1 and Tt2, respectively, the touch driving device 18 senses the touch input in each of the plurality of touch periods Tt1 and Tt2 and transmits coordinate information of a touch input to the host system 19 at a time point, at which each touch frame is completed. Hence, in the embodiment of the invention, the touch report rate may be higher than the display frame rate. The display frame rate is a frame frequency at which image data of one frame is written on the pixel array. The touch report rate is a frequency, at which coordinate information of the touch input is generated. Because coordinate recognition time of the touch input shortens as the touch report rate becomes higher, touch sensitivity of the touch screen is improved.

In particular, the touch driving device 18 removes a surplus period that is not used for the touch period in one display frame period and uses the entire duration of the one display frame period for touch frames, thereby further improving the touch report rate.

The touch driving device 18 according to the embodiment of the invention may be implemented as an integrated circuit (IC) package shown in FIGS. 5 to 7.

Referring to FIG. 5, the touch driving device 18 includes a driver IC DIC and a touch IC TIC.

The driver IC DIC includes a touch sensor channel unit 100, a Vcom buffer 110, a switch array 120, a timing control signal generator 130, a multiplexer (MUX) 140, and a DTX compensation unit 150.

The touch sensor channel unit 100 is connected to electrodes of the touch sensors through the sensor lines and is connected to the Vcom buffer 110 and the multiplexer 140 through the switch array 120. The multiplexer 140 connects the sensor lines to the touch IC TIC. In case of a 1-to-3 multiplexer, the multiplexer 140 sequentially connects one channel of the touch IC TIC to the three sensor lines in the time-division manner and thus reduces the number of channels of the touch IC TIC. The multiplexer 140 sequentially selects the sensor lines, which will be connected to the channel of the touch IC TIC, in response to MUX control signals MUXC1 to MUXC3. The multiplexer 140 is connected to the channels of the touch IC TIC through touch lines.

The Vcom buffer 110 outputs the common voltage Vcom of the pixel. The switch array 120 supplies the common voltage Vcom output from the Vcom buffer 110 to the touch sensor channel unit 100 during the display period under the control of the timing control signal generator 130. The switch array 120 connects the sensor lines to the touch IC TIC during the touch period under the control of the timing control signal generator 130.

The timing control signal generator 130 generates timing control signals for controlling operation timings of a display driving circuit and the touch IC TIC.

The timing control signal generator 130 of the driver IC DIC may be included in the timing controller 16 shown in FIG. 2. The timing control signal generator 130 drives the display driving circuit during the display period and drives the touch IC TIC during the touch period.

As shown in FIG. 4, the timing control signal generator 130 produces the touch enable signal TEN defining the display periods Td1 and Td2 and the touch periods Tt1 and Tt2 and synchronizes the display driving circuit with the touch IC TIC. The display driving circuit applies image data to the pixels during a first level period of the touch enable signal TEN. The touch IC TIC drives the touch sensors in response to a second level of the touch enable signal TEN and senses the touch input. A first level of the touch enable signal TEN may be a high level, and the second level of the touch enable signal TEN may be a low level, or vice versa.

The touch IC TIC is connected to a driving power unit (not shown) and receives driving power. The touch IC TIC produces the touch driving signal Tx in response to the second level of the touch enable signal TEN and applies the touch driving signal Tx to the touch sensors. The touch driving signal Tx may be generated in various pulse shapes including a square wave, a sine wave, a triangle wave, etc. However, it is preferable, but not required, that the touch driving signal Tx is generated in the pulse shape of the square wave. The touch driving signal Tx may be applied to each of the touch sensors N times, so that charges are accumulated on an integrator of the touch IC TIC N or more times, where N is a natural number equal to or greater than 2.

A noise of the touch driving signal may increase depending on changes in data of the input image. The DTX compensation unit 150 analyzes the data of the input image, removes a noise component from touch raw data depending on changes in a gray level of the input image, and transmits it to the touch IC TIC. DTX means Display and Touch crosstalk. The content related to the DTX compensation unit 150 is disclosed in detail in Korean Patent Application No. 10-2012-0149028 (Dec. 19, 2012) corresponding to the present applicant, and which are hereby incorporated by reference in their entirety. In case of a system, in which a noise of the touch sensor does not sensitively change depending on changes in data of the input image, the DTX compensation unit 150 is not necessary and thus may be omitted. In FIG. 5, "DTX DATA" is output data of the DTX compensation unit 150.

The touch IC TIC drives the multiplexer 140 in response to the touch enable signal TEN from the timing control signal generator 130 during the touch periods Tt1 and Tt2 and receives charges of the touch sensors through the multiplexer 140 and the sensor lines. In FIG. 5, MUXC1 to MUXC3 is the MUX control signals selecting the channel of the multiplexer.

The touch IC TIC detects a change in charges before and after the touch input from the touch driving signal and compares the change in charges with a predetermined threshold value. The touch IC TIC determines a location of the touch sensors having the change in charges, which is equal to or greater than the threshold value, as an area of the touch input. The touch IC TIC calculates coordinates of each touch input and transmits touch data TDATA(XY) including coordinate information of the touch input to the external host system 19. The touch IC TIC includes an amplifier amplifying charges of the touch sensor, an integrator accumulating charges received from the touch sensor, an analog-to-digital converter (ADC) converting a voltage of the integrator into digital data, and an arithmetic logic unit. The arithmetic logic unit compares touch raw data output from the ADC with the threshold value and determines the touch input based on the result of a comparison. The arithmetic logic unit performs a touch recognition algorithm calculating coordinates.

The driver IC DIC and the touch IC TIC may transmit and receive signals through a serial peripheral interface (SPI).

The host system 19 means a system main body of an electronic device, to which the display device 10 according to the embodiment of the invention is applicable. The host system 19 may be implemented as one of a phone system, a television system, a set-top box, a navigation system, a DVD player, a Blu-ray player, a personal computer (PC), and a home theater system. The host system 19 transmits data RGB of the input image to the driver IC DIC and receives touch input data TDATA(XY) from the touch IC TIC. The host system 19 executes an application associated with the touch input.

Referring to FIG. 6, the touch driving device 18 includes a driver IC DIC and a microcontroller unit (MCU).

The driver IC DIC includes a touch sensor channel unit 100, a Vcom buffer 110, a switch array 120, a first timing control signal generator 130, a multiplexer (MUX) 140, a DTX compensation unit 150, a sensing unit 160, a second timing control signal generator 170, and a memory 180. The driver IC DIC shown in FIG. 6 is different from the driver IC DIC shown in FIG. 5 in that the sensing unit 160 and the second timing control signal generator 170 are integrated inside the driver IC DIC. The first timing control signal generator 130 of FIG. 6 is substantially the same as the timing control signal generator 130 of FIG. 5. Thus, the first timing control signal generator 130 generates timing control signals for controlling operation timings of the display driving circuit and the touch IC TIC.

The multiplexer 140 floats electrodes of the touch sensor accessed by the sensing unit 160 under the control of the MCU. The sensing unit 160 accesses other touch sensor electrodes except the touch sensor electrodes connected to the pixels charged to the data voltage. The multiplexer 140 may supply the common voltage Vcom under the control of the MCU. As shown in FIG. 8, when a resolution of the touch screen is M×N, the number of multiplexers 140 required for the resolution is M, where M and N are a positive integer equal to or greater than 2. When the resolution of the touch screen is M×N, touch sensor electrodes 22 are divided into M×N. Each multiplexer 140 is connected to the N touch sensor electrodes 22 through N sensor lines 115 and sequentially connects the N sensor lines 115 to one sensing unit 160.

The sensing unit 160 is connected to the sensor lines 115 through the multiplexer 140. The sensing unit 160 measures a change in a waveform of the voltage received from the touch sensor electrodes 22 and converts the change into digital data. The sensing unit 160 includes an amplifier amplifying the received voltages of the touch sensor electrodes 22, an integrator accumulating the amplified voltages of the amplifier, and an analog-to-digital converter (ADC) converting a voltage of the integrator into digital data. The digital data output from the ADC is touch raw data TDATA and is transmitted to the MCU. When the resolution of the touch screen is M×N as shown in FIG. 8, the M sensing units 160 are necessary.

The second timing control signal generator 170 generates timing control signals and clocks for controlling operation timings of the multiplexer 140 and the sensing unit 160. The DTX compensation unit 150 may be omitted in the driver IC DIC. The memory 180 temporarily stores the touch raw data TDATA under the control of the second timing control signal generator 170.

The driver IC DIC and the MCU may transmit and receive signals through a serial peripheral interface (SPI). The MCU compares the touch raw data TDATA with a predetermined threshold value and determines a touch input based on the result of a comparison. The MCU performs a touch recognition algorithm calculating coordinates.

Referring to FIG. 7, the touch driving device 18 includes a driver IC DIC and a memory MEM.

The driver IC DIC includes a touch sensor channel unit 100, a Vcom buffer 110, a switch array 120, a first timing control signal generator 130, a multiplexer 140, a DTX compensation unit 150, a sensing unit 160, a second timing control signal generator 170, a memory 180, and a MCU 190. The driver IC DIC shown in FIG. 7 is different from the driver IC DIC shown in FIG. 6 in that the MCU 190 is integrated inside the driver IC DIC. The MCU 190 compares touch raw data TDATA with a predetermined threshold value and determines a touch input based on the result of a comparison. The MCU 190 performs a touch recognition algorithm calculating coordinates.

The memory MEM stores a register setting value related to timing information required in operations of the display driving circuit and the sensing unit 160. When the display device 10 is powered on, the register setting value is loaded from the memory MEM to the first timing control signal generator 130 and the second timing control signal generator 170. The first timing control signal generator 130 and the second timing control signal generator 170 generate timing control signals for controlling the display driving circuit and the sensing unit 160 based on the register setting value read from the memory MEM. The embodiment of the invention can respond to changes in a model of a driving device without change in a structure of the driving device by changing the register setting value of the memory MEM.

The display module may include the display panel DIS, the display driving circuit (12, 14, and 16), and the host system 19.

The display panel DIS includes a liquid crystal layer formed between an upper substrate and a lower substrate. The pixel array of the display panel DIS includes pixels formed in pixel areas defined by the data lines D1 to Dm and the gate lines G1 to Gn, where m and n are a positive integer. Each pixel includes thin film transistors (TFTs) formed at crossings of the data lines D1 to Dm and the gate lines G1 to Gn, a pixel electrode charged to the data voltage, a storage capacitor which is connected to the pixel electrode and holds a voltage of a liquid crystal cell, and the like.

Black matrixes, color filters, etc. may be formed on the upper substrate of the display panel DIS. The lower substrate of the display panel DIS may be configured in a COT (color filter on TFT) structure. In this instance, the black matrixes and the color filters may be formed on the lower substrate of the display panel DIS. A common electrode, to which the common voltage Vcom is supplied, may be formed on the upper substrate or the lower substrate of the display panel DIS. Polarizing plates are respectively attached to the upper substrate and the lower substrate of the display panel DIS. Alignment layers for setting a pre-tilt angle of liquid crystals are respectively formed on the inner surfaces contacting the liquid crystals in the upper substrate and the lower substrate of the display panel DIS. A column spacer is formed between the upper substrate and the lower substrate of the display panel DIS to keep cell gaps of the liquid crystal cells constant.

A backlight unit may be disposed under a back surface of the display panel DIS. The backlight unit may be implemented as one of an edge type backlight unit and a direct type backlight unit and irradiates light onto the display panel DIS. The display panel DIS may be implemented in any known mode including a twisted nematic (TN) mode, a vertical alignment (VA) mode, an in-plane switching (IPS) mode, a fringe field switching (FFS) mode, etc.

The display driving circuit includes the data driving circuit 12, the gate driving circuit 14, and the timing controller 16. The display driving circuit applies video data of an input image to the pixels of the display panel DIS. The data driving circuit 12 converts digital video data RGB received from the timing controller 16 into positive and negative analog gamma compensation voltages and outputs the data voltage. The data driving circuit 12 then supplies the data voltage to display pixels via the data lines D1 to Dm. The gate driving circuit 14 sequentially supplies the gate pulse (or the scan pulse) synchronized with the data voltage to the gate lines G1 to Gn and selects pixel lines of the display panel DIS to which the data voltage is applied.

The timing controller 16 receives timing signals, such as a vertical sync signal Vsync, a horizontal sync signal Hsync, a data enable signal DE, and a main clock MCLK, from the host system 19. The timing controller 16 synchronizes operation timings of the data driving circuit 12 and the gate driving circuit 14 with each other. The timing controller 16 generates a data timing control signal and a scan timing control signal for respectively controlling the operation timings of the data driving circuit 12 and the gate driving circuit 14 using the timing signals. The data timing control signal includes a source sampling clock SSC, a source output enable signal SOE, a polarity control signal POL, etc. The scan timing control signal includes a gate start pulse GSP, a gate shift clock GSC, a gate output enable signal GOE, and the like.

The host system 19 transmits the digital video data RGB and the timing signals Vsync, Hsync, DE, and MCLK to the timing controller 16. Further, the host system 19 may execute an application associated with touch coordinate information (XY) received from the touch driving device 18.

The touch enable signal TEN of FIG. 4 may be generated in the host system 19. During the display periods Td1 and Td2, the data driving circuit 12 supplies the data voltage to the data lines D1 to Dm under the control of the timing controller 16, and the gate driving circuit 14 sequentially supplies the gate pulse synchronized with the data voltage to the gate lines G1 to Gn under the control of the timing controller 16. During the display periods Td1 and Td2, the touch driving device 18 stops operating.

During the touch periods Tt1 and Tt2, the touch driving device 18 applies the touch sensor driving signal Tx to the touch sensors of the touch screen TSP. During the touch period Tt2, the display driving circuit (12, 14, and 16) may supply an AC signal having the same amplitude and the same phase as the touch driving signal Tx to the signal lines D1 to Dm and G1 to Gn, so as to minimize a parasitic capacitance between the signal lines D1 to Dm and G1 to Gn connected to the pixels and the touch sensors. In this instance, a display noise mixed with the touch driving signal Tx is greatly reduced, and the accuracy of the touch sensing increases.

The display device 10 according to the embodiment of the invention may further include an active stylus pen 20 communicating with the touch driving device 18. The active stylus pen 20 produces a pen driving signal based on the touch driving signal Tx input from the touch screen TSP and outputs the pen driving signal at a contact location of the active stylus pen 20 and the touch screen TSP, thereby helping the touch driving device 18 find a touch input location on the touch screen TSP. In particular, the touch driving device 18 according to the embodiment of the invention may inform the active stylus pen 20 of a dummy touch period for differentiating the touch frames. The touch driving device 18 also senses pen information (including a pen pressure, identification (ID) of the pen, etc.) based on the pen driving signal input from the active stylus pen 20. This is described later with reference to FIGS. 19 and 20.

Figure 9:
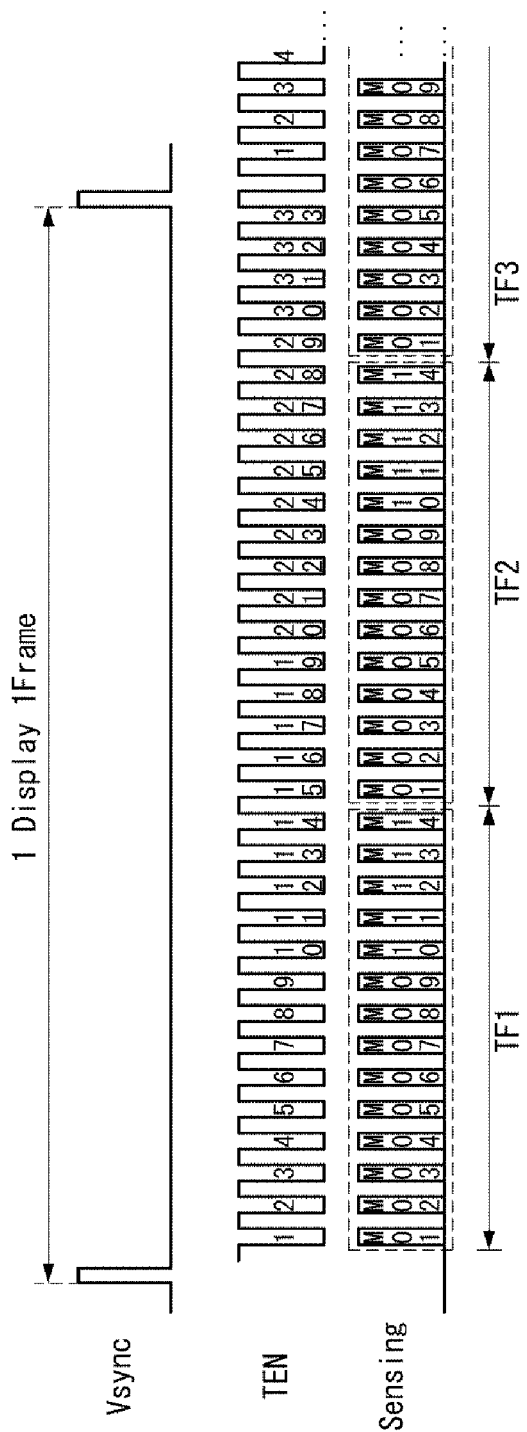
FIG. 9 shows an example of a method for increasing a touch report rate in accordance with an exemplary embodiment of the invention.
Figure 10:
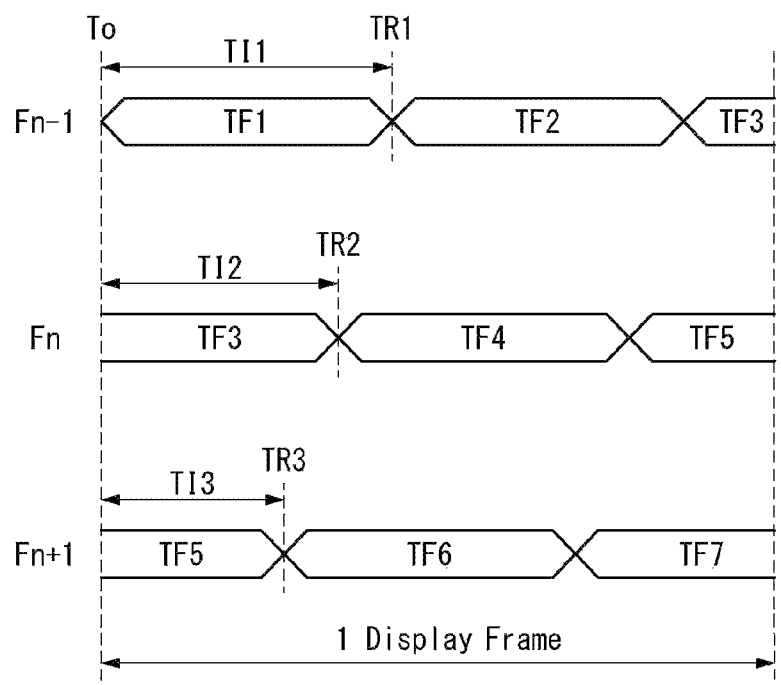
FIGS. 10 and 11 show that adjacent display frame periods are different from each other in a time required to reach a first touch report time of a display frame period from a start time point of the display frame period in accordance with an exemplary embodiment of the invention.
Figure 11:
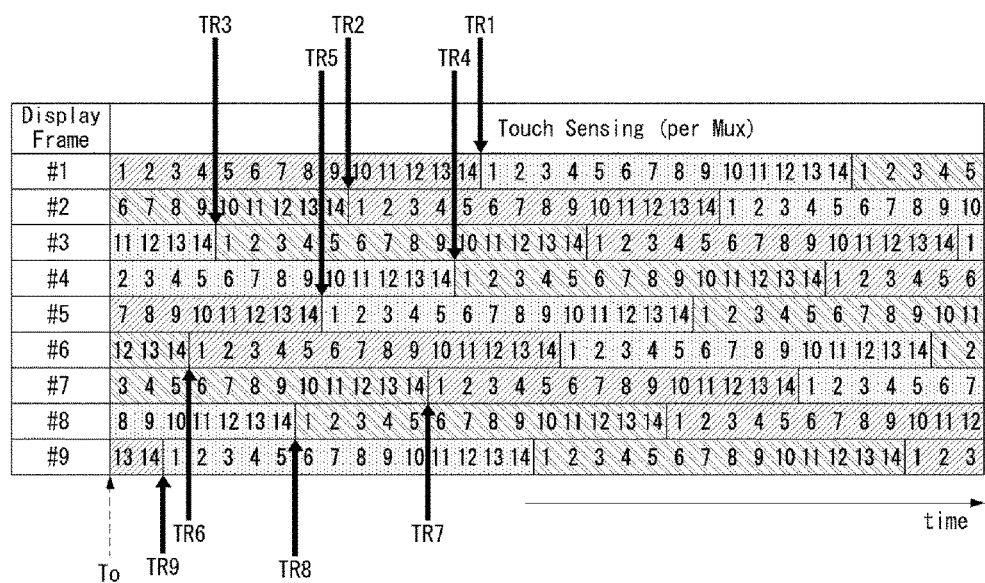
Figure 12:
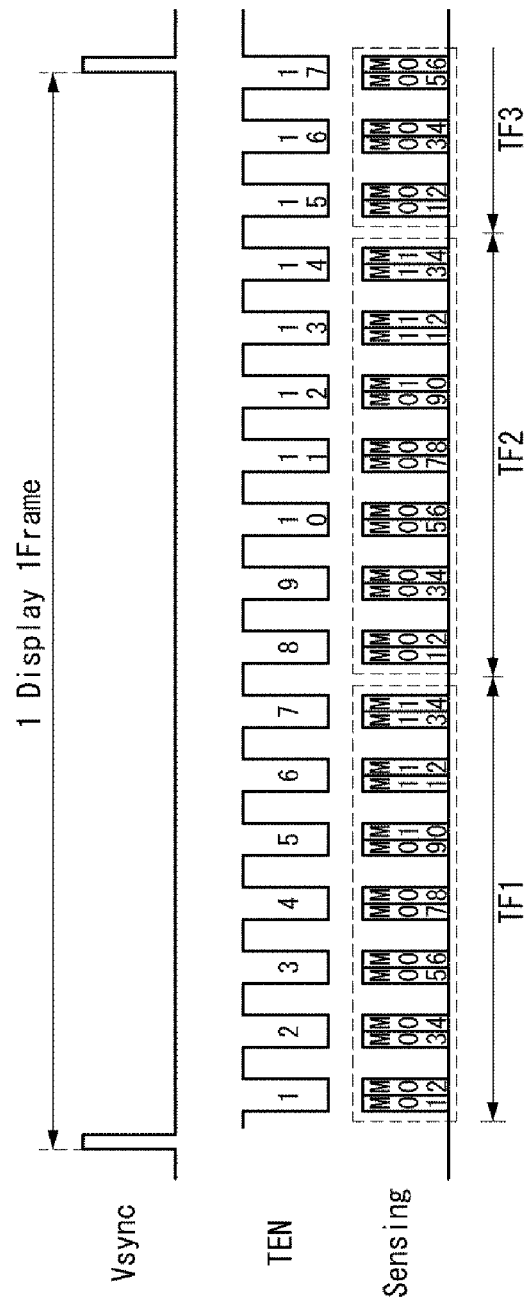
FIG. 12 shows another example of a method for increasing a touch report rate in accordance with an exemplary embodiment of the invention.

FIG. 9 shows an example of a method for increasing the touch report rate in accordance with the embodiment of the invention. FIGS. 10 and 11 show that adjacent display frame periods are different from each other in a time required to reach a first touch report time of a display frame period from a start time point of the display frame period in accordance with the embodiment of the invention. FIG. 12 shows another example of a method for increasing the touch report rate in accordance with the embodiment of the invention.

Referring to FIGS. 9 to 11, the touch driving device 18 according to the embodiment of the invention assigns at least two touch frames for driving the touch sensors to one display frame period during which an input image is displayed and thus further increases the touch report rate compared to the display frame rate. A display frame period may refer to the period of time that begins with one Vsync pulse and ends with the next Vsync pulse. During the display frame period, the data driver 12 drives a new frame of image data to all of the pixels in the display device 10 via data lines, thereby refreshing the pixels with new data. The display frame period is typically inversely proportional to the refresh rate of the display device 10. For example, if the refresh rate is 60 hz, the display frame period is 1 sec/60=16.7 ms.

In the embodiment disclosed herein, one touch frame is a touch cycle required for the touch drive device 18 drives touch driving signals to all of the touch sensor lines 115 and touch sensor electrodes 22 a single time. A single touch report is produced for a single touch cycle. A touch frame may include multiple touch periods. Each touch period occurs when the touch enable TEN signal has a logic low voltage. During a touch period, touch driving signals are provided to a subset of the touch sensor electrodes 22 and touch is sensed for the subset of touch sensor electrodes 22. Thus, multiple touch periods are needed to provide touch driving signals to all of the touch sensor electrodes 22.

The embodiment of the invention describes a case of driving the touch screen having a resolution of 14×N using 14 multiplexers M01 to M14 as an example. Thus, in the embodiment of the invention, one touch frame is the time required to use all of the 14 multiplexers M01 to M14 to drive all touch sensor lines 115 of the display panel. The multiplexers M01 to M14 sequentially connect touch blocks of the touch screen to the sensing unit 160. One touch block includes the plurality of touch sensors disposed on one column. The multiplexers M01 to M14 are sequentially turned on in the touch periods. The touch periods are synchronized with a second logic level (for example, a low logic level) of the touch enable signal TEN. Hence, the sensing unit 160 sequentially sense changes in capacitances of the touch sensors through the multiplexers M01 to M14 on a per block basis. The number of multiplexers M01 to M14 may be the same as the number of touch blocks.

Alternatively, in another embodiment, the touch screen has a resolution of M×14. There are M multiplexers, each connected to fourteen touch sensor lines 115. In this embodiment, the notation in FIG. 9 of "M01" and "M02" refers to which of the fourteen touch sensor lines 115 connected to a multiplexer is selected by a multiplexer. For example, during touch period M01, each of the multiplexers selects a sensor line 115 connected to the top row of touch sensors 22 in FIG. 8. During touch period M02, each of the multiplexers selects a sensor line 115 connected to the second row of touch sensors 22 in FIG. 8. Thus, in each touch period a different subset of touch driving lines 115 and touch sensors 22 is driven with touch driving signals.

The display driving circuit applies the image data to the pixels in the display periods. The display driving circuit also applies a common voltage to the touch sensor electrodes 22 for image display during the display periods. The display periods are synchronized with the touch enable signal TEN and occur when the touch enable signal TEN has a high logic level. As shown in FIG. 9, the toggling of the touch enable signal TEN results in alternating touch periods and display periods.

The touch driving device 18 according to the embodiment of the invention is configured so that the touch report rate is non-integer times (for example, N·M times, where N and M are a positive integer) higher than the display frame rate, thereby removing the surplus period that is not used as the touch period in one display frame period and further improving the touch report rate. The touch driving device 18 according to the embodiment of the invention assigns first and second touch frames TF1 and TF2 to one display frame period and uses a remaining period of the one display frame period as a portion of a third touch frame TF3. Thus, the remaining period of the one display frame period no longer serves as a surplus period.

The touch driving device 18 according to the embodiment of the invention assigns touch frames to the entire duration of one display frame period. Hence, at least two adjacent display frame periods are different from each other in a time that is required to reach a first touch report time from a start of the one display frame period.

Additionally, some touch frame periods begin in one display frame period and end in the immediately following display frame period. For such a divided touch frame, some touch sensors 22 are driven with touch driving signals during one display frame period and other touch sensors 22 are driven with touch driving signals during the immediately following display frame period. A single touch report describing touch coordinates is generated as a result of the touch driving signals driven during the divided touch frame.

For example, as shown in FIG. 10, there are three successive display frame periods: Fn−1, Fn and Fn+1. Display frame period Fn immediately follows display frame period Fn−1, and display frame period Fn+1 immediately follows display frame period Fn. When first to seventh touch frames TF1 to TF7 are dividedly assigned to (n−1)th, nth, and (n+1)th display frame periods Fn−1, Fn, and Fn+1, a first time interval TI1 required to reach a first initial touch report time TR1 of the (n−1)th display frame period Fn−1 from a start time point To of the (n−1)th display frame period Fn−1 is different from a second time interval TI2 required to reach a first initial touch report time TR2 of the nth display frame period Fn from a start time point To of the nth display frame period Fn. Further, the second time interval TI2 required to reach the first initial touch report time TR2 of the nth display frame period Fn from the start time point To of the nth display frame period Fn is different from a third time interval TI3 required to reach a first initial touch report time TR3 of the (n+1)th display frame period Fn+1 from a start time point To of the (n+1)th display frame period Fn+1.

This is because some touch frames are divided and assigned to two adjacent display frame periods. For example, the third touch frame TF3 is dividedly assigned to the (n−1)th display frame period Fn−1 and the nth display frame period Fn, and the fifth touch frame TF5 is dividedly assigned to the (n−1)th display frame period Fn−1 and the nth display frame period Fn.

The first part of touch frame TF3 occurs during display frame period Fn−1, and the second part of touch frame TF3 occurs during display frame period Fn. At time TR2, a single touch report is generated. The touch report at time TR2 includes touch information corresponding to the touch driving signals driven during touch frame TF3. No other intervening touch reports are generated between the start of display frame period Fn and the touch report time TR2.

The first part of touch frame TF5 occurs during display frame period Fn, and the second part of touch frame TF3 occurs during display frame period Fn+1. At time TR3, a single touch report is generated. The touch report at time TR3 includes touch information corresponding to the touch driving signals driven during touch frame TF5. No other intervening touch reports are generated between the start of display frame period Fn+1 and the touch report time TR3.

As shown in FIG. 11, the touch driving device 18 according to the embodiment of the invention may be configured so that first to ninth display frame periods are different from one another in a time required to reach a first touch report time point (i.e., TR1 to TR9) of the display frame period from a start time point of the display frame period. In other words, the touch driving device 18 according to the embodiment of the invention may cause a time interval between a start time point To of a first display frame period #1 and a first touch report time point TR1 of the first display frame period #1, a time interval between a start time point To of a second display frame period #2 and a first touch report time point TR2 of the second display frame period #2, a time interval between a start time point To of a third display frame period #3 and a first touch report time point TR3 of the third display frame period #3, a time interval between a start time point To of a fourth display frame period #4 and a first touch report time point TR4 of the fourth display frame period #4, a time interval between a start time point To of a fifth display frame period #5 and a first touch report time point TR5 of the fifth display frame period #5, a time interval between a start time point To of a sixth display frame period #6 and a first touch report time point TR6 of the sixth display frame period #6, a time interval between a start time point To of a seventh display frame period #7 and a first touch report time point TR7 of the seventh display frame period #7, a time interval between a start time point To of an eighth display frame period #8 and a first touch report time point TR8 of the eighth display frame period #8, and a time interval between a start time point To of a ninth display frame period #9 and a first touch report time point TR9 of the ninth display frame period #9 to be different from one another.

As shown in FIG. 12, the touch driving device 18 according to the embodiment of the invention may sequentially drive two multiplexers in one touch period (period during which the touch enable signal TEN is maintained at the second logic level) and may perform a sensing operation of two touch blocks. In the same manner, the touch driving device 18 according to the embodiment of the invention may sequentially drive plurality of multiplexers in one touch period (period in which the touch enable signal TEN is maintained at the second logic level), and may perform a sensing operation of a plurality of touch blocks.

Figure 13:
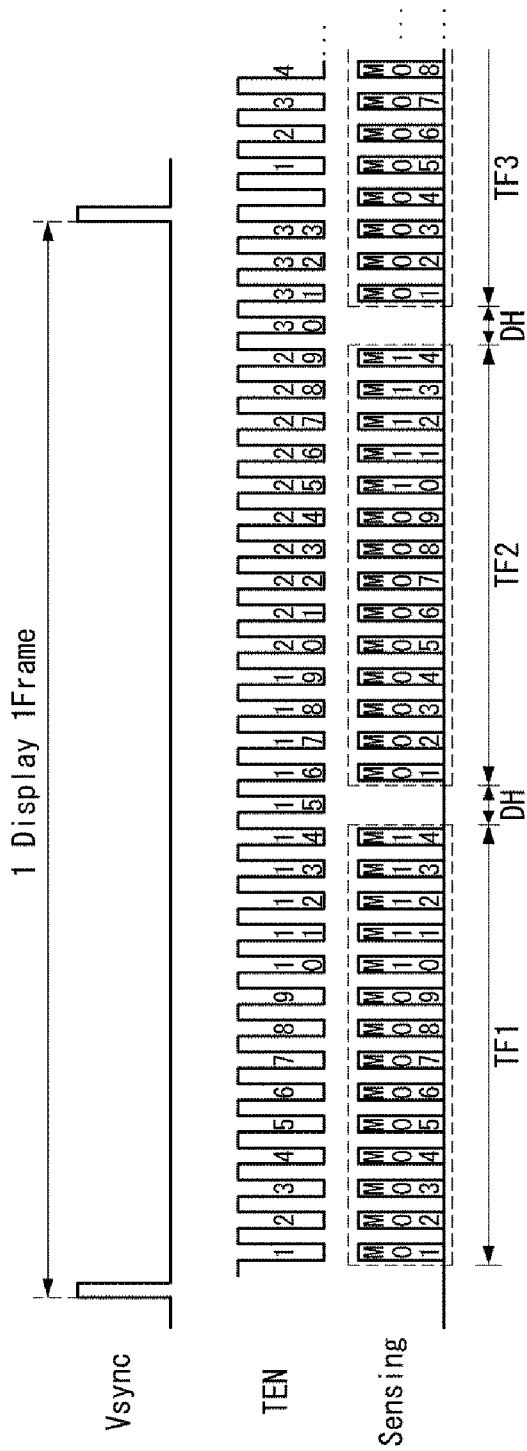
FIGS. 13 and 14 show another example of a method for increasing a touch report rate in accordance with an exemplary embodiment of the invention.
Figure 14:
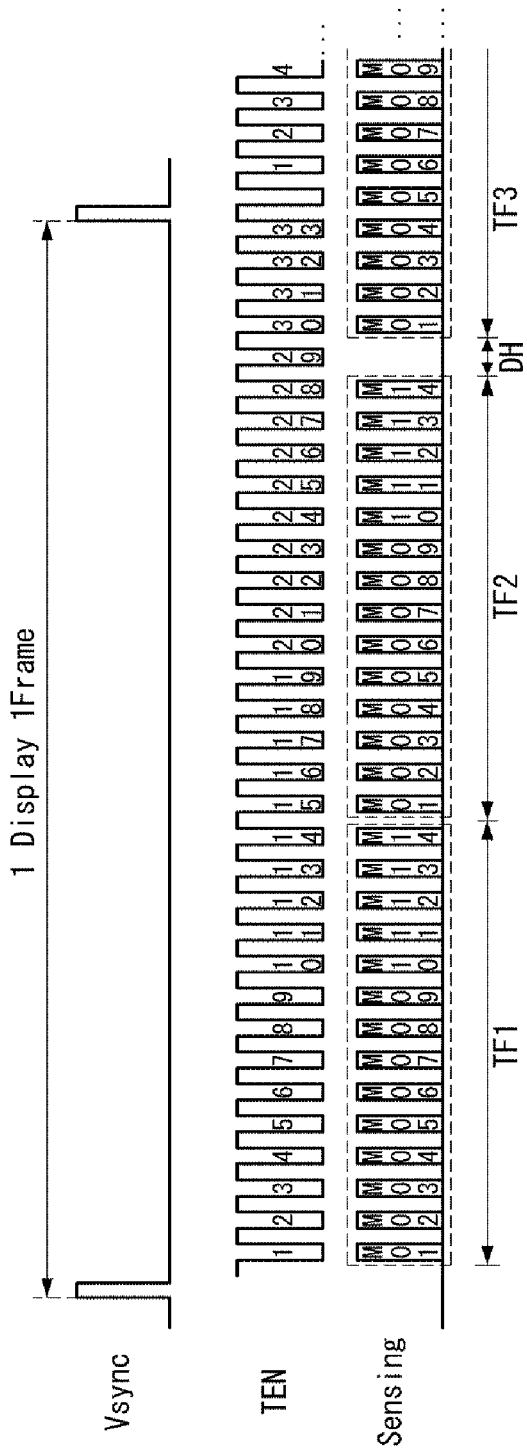

FIGS. 13 and 14 show another example of a method for increasing the touch report rate in accordance with the embodiment of the invention. FIGS. 15 to 18 show an example of implementing a frequency hopping technology using a dummy touch period shown in FIGS. 13 and 14.

Referring to FIGS. 13 and 14, the touch driving device 18 according to the embodiment of the invention may further assign at least one dummy touch period DH to one display frame period. The dummy touch period DH may be positioned between the adjacent touch frames.

As shown in FIG. 13, the dummy touch period DH may be positioned between every two adjacent touch frames of one display frame period. For example, the dummy touch periods DH may be positioned between first and second touch frames TF1 and TF2 and between second and third touch frames TF2 and TF3, respectively.

As shown in FIG. 14, the dummy touch period DH may be positioned in an interval between adjacent touch frames of one display frame period. For example, the dummy touch period DH may be positioned only between the second and third touch frames TF2 and TF3.

During the dummy touch period DH, a touch driving signal may be driven to one or more touch sensors 22 via one or more touch lines 115. The touch driving signal may include one or more dummy touch pulses. The touch driver device 18 may also generate touch data values in response to charge generated by the touch driving signal during the dummy touch period DH. However, the touch driver device 18 does not use the touch data values for touch sensing nor does it generate any touch report from the touch data values. Instead, the touch driver device 18 uses the touch data for other purposes described below.

Figure 17:
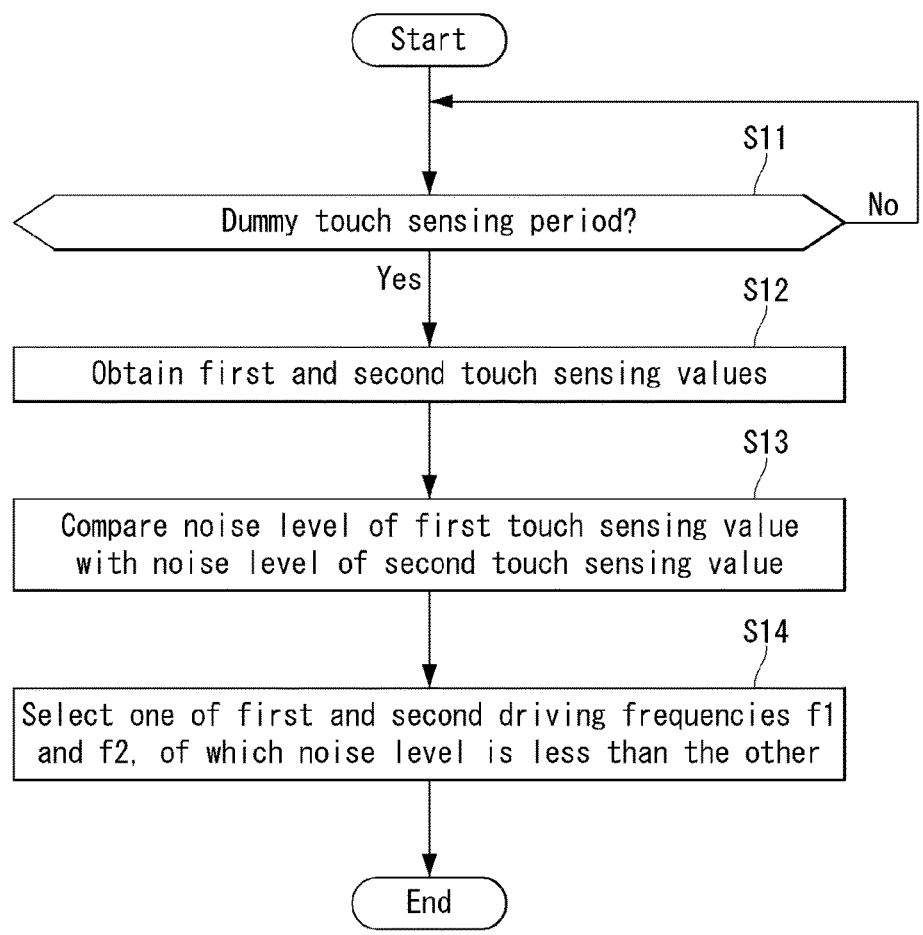
Figure 18:
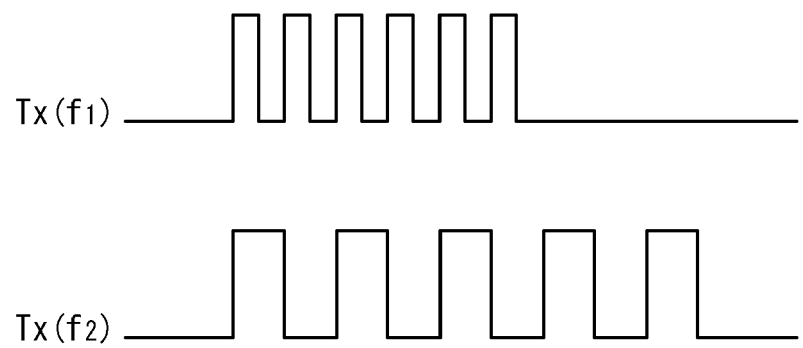
Figure 19:
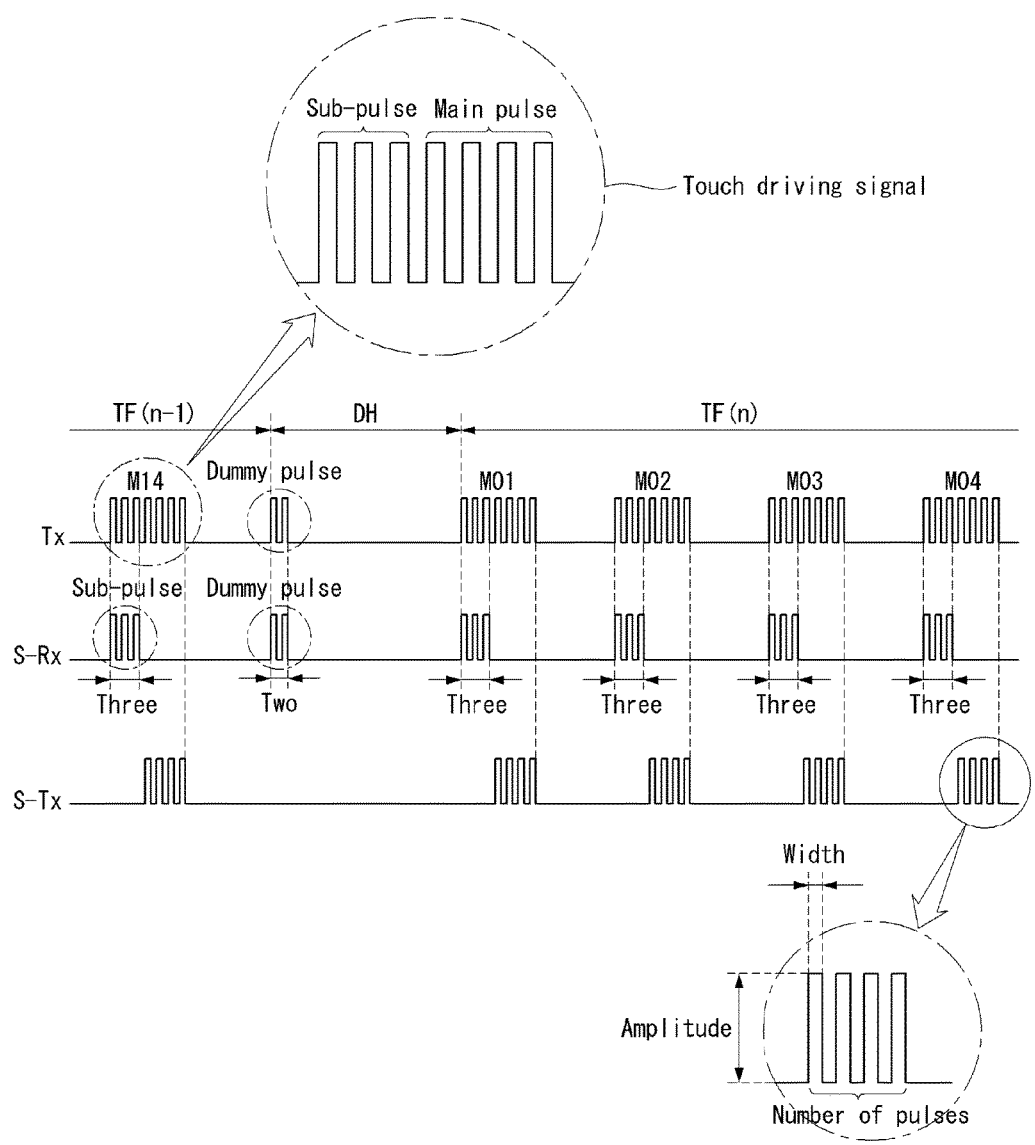
FIG. 19 shows an example of a touch driving signal for communicating with an active stylus pen.
Figure 20:
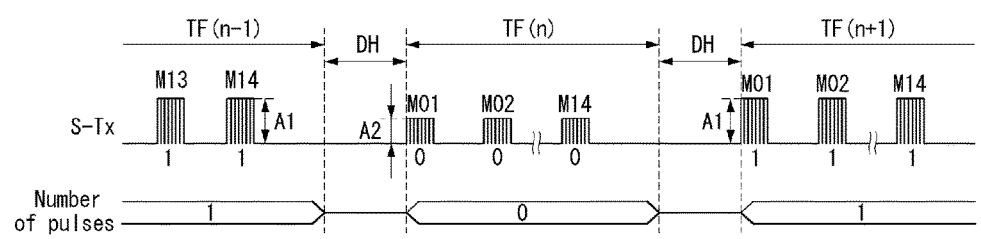
FIG. 20 shows an example of sensing pen information based on a pen driving signal input from an active stylus pen.

For example, the dummy touch period DH may be used in a frequency hopping technology for avoiding a noise as shown in FIGS. 15 to 18 and may be used to communicate with the active stylus pen 20 as shown in FIGS. 19 and 20.

An example of the frequency hopping technology according to the embodiment of the invention is described below with reference to FIGS. 15, 16, and 18.

Figure 15:
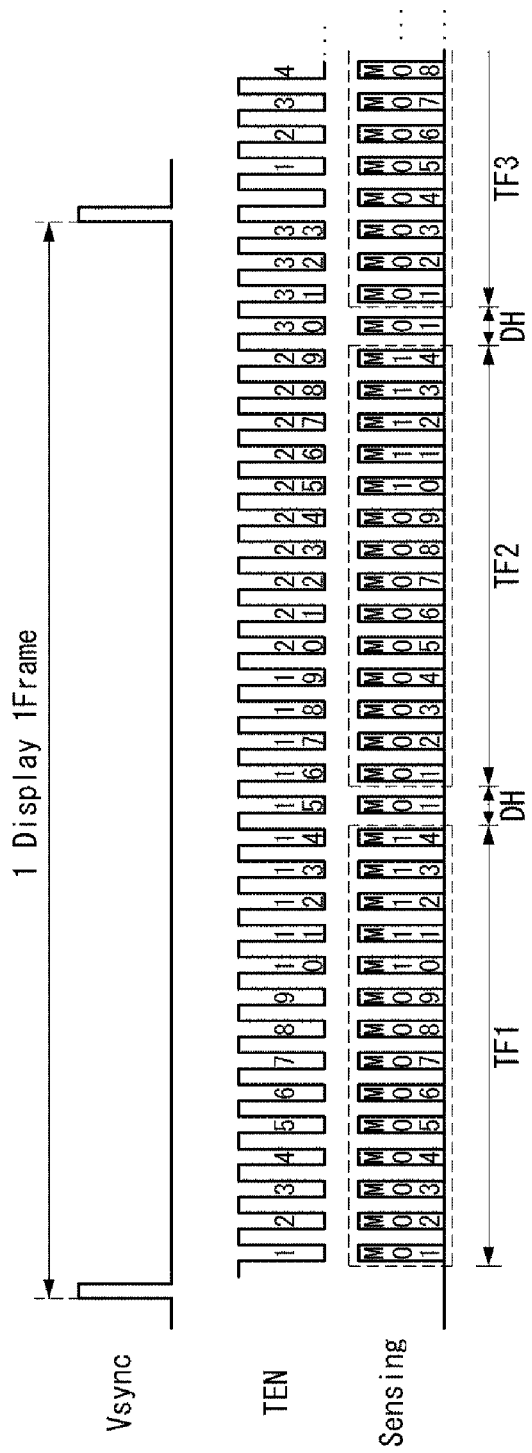
FIGS. 15 to 18 show an example of implementing a frequency hopping technology using a dummy touch period shown in FIGS. 13 and 14.
Figure 16:
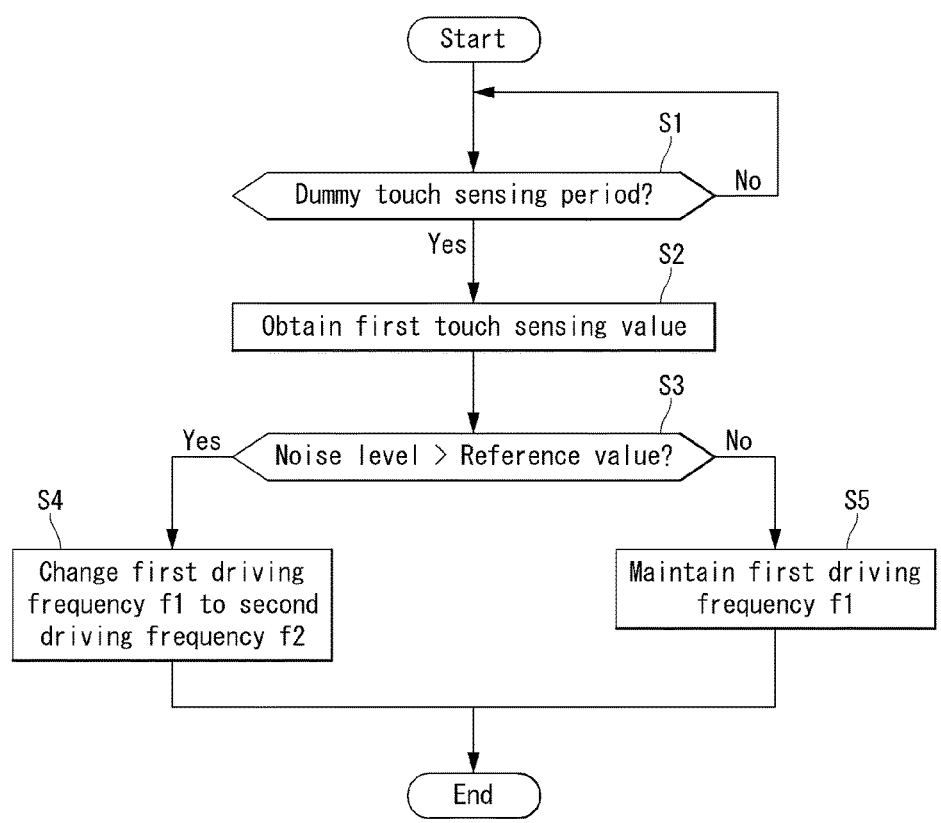

As shown in FIGS. 15, 16, and 18, the touch driving device 18 according to the embodiment of the invention counts low logic periods of the touch enable signal TEN and determines a time location of the dummy touch period DH in step S1. The touch driving device 18 supplies a touch driving signal Tx(f1) having a first driving frequency f1 to some (for example, the touch sensors connected to a first multiplexer) of the touch sensors during the dummy touch period DH and obtains a first touch sensing value in step S2. The touch driving device 18 analyzes a noise level of the first touch sensing value and compares the noise level of the first touch sensing value with a predetermined reference value in step S3.

When the noise level of the first touch sensing value exceeds the reference value, the touch driving device 18 changes a driving frequency of the touch driving signal Tx to a second driving frequency f2 different from the first driving frequency f1 and then applies a touch driving signal Tx(f2) having the second driving frequency f2 to a touch frame following the dummy touch period DH in step S4. When the noise level of the first touch sensing value does not exceed the reference value, the touch driving device 18 maintains the driving frequency of the touch driving signal Tx at the first driving frequency f1 and then applies the touch driving signal Tx(f1) having the first driving frequency f1 to a touch frame following the dummy touch period DH in step S5. The touch sensors sensed in the dummy touch period DH may be fixed, or may change at predetermined time intervals or at random time intervals.

Another example of the frequency hopping technology according to the embodiment of the invention is described below with reference to FIGS. 15, 17, and 18.

As shown in FIGS. 15, 17, and 18, the touch driving device 18 according to the embodiment of the invention counts low logic periods of the touch enable signal TEN and determines a time location of the dummy touch period DH in step S11.

The touch driving device 18 according to the embodiment of the invention stores a first touch sensing value obtained by supplying a touch driving signal Tx(f1) having a first driving frequency f1 to some (for example, the touch sensors connected to a first multiplexer) of the touch sensors in a first touch frame TF1 prior to the dummy touch period DH. The touch driving device 18 supplies a touch driving signal Tx(f2) having a second driving frequency f2 different from the first driving frequency f1 to some (for example, the touch sensors connected to the first multiplexer) of the touch sensors during the dummy touch period DH and obtains a second touch sensing value in step S12. The touch driving device 18 analyzes noise levels of the first and second touch sensing values and compares the noise level of the first touch sensing value with the noise level of the second touch sensing value in step S13. The touch driving device 18 applies the touch driving signal having one of the first and second driving frequencies f1 and f2, of which the noise level is less than the other, to a second touch frame TF2 following the dummy touch period DH in step S14. The touch sensors sensed in the dummy touch period DH may be fixed, or may change at predetermined time intervals or at random time intervals.

FIG. 19 shows an example of the touch driving signal Tx for communicating with the active stylus pen 20 shown in FIG. 2. FIG. 20 shows an example of sensing pen information based on a pen driving signal input from the active stylus pen 20 shown in FIG. 2.

The active stylus pen 20 is a device producing a pen driving signal S-Tx based on the touch driving signal Tx input from the touch screen TSP and then outputting the pen driving signal S-Tx at a contact location of the active stylus pen 20 and the touch screen TSP. The touch driving device 18 senses the pen driving signal S-Tx and can effectively detect a touch location of the active stylus pen 20. Various additional functions including touch pressure (pen pressure) information, touch ID information, driving information related to various touch buttons, etc. are recently required for the active stylus pen 20. Hence, as shown in FIG. 19, the active stylus pen 20 may sense a dummy touch period DH based on a dummy pulse different from the touch driving signal Tx pulses and differentiate the touch frames through the dummy touch period DH. The active stylus pen 20 may process the pen driving signal S-Tx in each touch frame and output the pen driving signal S-Tx including the above additional functions.

The touch driving device 18 may output the touch driving signal Tx pulses to the display panel (or the touch screen) in a touch period (i.e. a period in which M01, M02, M03, M04, . . . , and M14 operate) of a touch frame TF and output the dummy pulses different from the touch driving signal Tx pulses to the display panel in the dummy touch period DH. The dummy pulses may be produced differently from and have different characteristics than the touch driving signal Tx pulses. For example, as shown in FIG. 19, the number of dummy pulses may be different from the number of pulses of the touch driving signal Tx. In other words, the touch driving signal Tx pulses produced in one touch period may be composed of seven pulses including three sub-pulses and four main pulses, and the dummy pulse may be composed of two pulses. The sub-pulses of the touch driving signal Tx are additional pulses used to check the validity of the touch driving signal Tx. A width of the dummy pulses may be different from a width of the sub-pulses and main pulses of the touch driving signal Tx, and also an amplitude of the dummy pulse may be different from a pulse amplitude of the sub-pulses and main pulses of the touch driving signal Tx.

The active stylus pen 20 may sense that the dummy pulses input from the display panel are different from the pulses of the touch driving signal Tx, thereby differentiating the touch frames TF. The active stylus pen 20 may produce the pen driving signal S-Tx synchronized with the main pulse of the touch driving signal Tx and output the pen driving signal S-Tx to the display panel. In this instance, one of a pulse amplitude, a pulse width, and the number of pulses of the pen driving signal S-Tx may be controlled every J touch frames and may be expressed by a binary number using "0" and "1", where J is a natural number. Hence, the various additional functions of the active stylus pen 20 may be achieved through the pen driving signal S-Tx.

For example, as shown in FIG. 20, the active stylus pen 20 may control pulse amplitudes A1 and A2 (A1>A2) of the pen driving signal S-Tx in each touch frame and assign the pen information of one bit to each touch frame. In this instance, the active stylus pen 20 may use eight touch frames so as to implement the pen information of eight bits. However, when the additional functions are represented using the pen driving signal S-Tx, the pen driving signal S-Tx has to be processed at a level that makes it possible to detect a touch location. In other words, each of amplitudes of two different pulses expressed as the binary number has to have a minimum magnitude required to detect the touch location, and each width of two different pulses expressed as the binary number has to have a minimum magnitude required to detect the touch location. In the same manner, two pulses expressed as the binary number is a minimum number of pulses required to detect the touch location.

Touch raw data may increase in proportional to each of the pulse amplitude, the pulse width, and the number of pulses of the pen driving signal S-Tx. The touch driving device 18 may sense an amount of changes in the touch raw data in response to the pen driving signal S-Tx and sense the touch input location and the pen information related to the additional functions based on the amount of changes.

As described above, the embodiment of the invention can remove the surplus period that is not used for a touch period in one display frame period and can further improve the touch report rate by increasing the touch report rate so that the touch report rate is non-integer times (for example, N·M times, where N and M are a positive integer) higher than the display frame rate.

Furthermore, the embodiment of the invention further assigns the dummy touch period differentiating the touch frames to one display frame period and uses the dummy touch period in the communication with the active stylus pen, thereby effectively sense the touch input location and the pen information related to the additional functions.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensitive display device comprising:
    a display panel comprising a plurality of pixels and a plurality of touch sensors, each touch sensor connected to at least one respective pixel of the pixels, the display panel driven in a plurality of successive display frame periods and during each display frame period a respective frame of image data is driven to the pixels; and
    a touch driving circuit to drive touch driving signals to the touch sensors during a touch frame that begins in a first display frame period of the display frame periods and ends in a second display frame period of the display frame periods that immediately follows the first display frame period,
    the touch driving circuit receiving a touch enable signal that repeatedly alternates between a first logic level corresponding to a display period and a second logic level corresponding to a touch period, the touch driving circuit driving the touch driving signals to only a single corresponding row of the plurality of touch sensors every time the touch enable signal is at the second logic level during the touch frame,
    wherein a first time interval required to reach a first initial touch report time of the first display frame period from a start time point of the first display frame period is different from a second time interval required to reach a first initial touch report time of the second display frame period from a start time point of the second display frame period.

2. The touch sensitive display device of claim 1, wherein the touch driving circuit drives touch driving signals to the touch sensors during the touch frame by:
    driving touch driving signals to a first subset of the touch sensors during the first display frame period;
    driving touch driving signals to a second subset of the touch sensors during the second display frame period; and
    generating a touch report describing coordinates of a touch based on the touch driving signals driven to the first subset of the touch sensors during the first display frame period and also based on the touch driving signals driven to the second subset of the touch sensors during the second display frame period.

3. The touch sensitive display device of claim 1, wherein the touch driving circuit:
    generates a first touch report in the first display frame period, the first touch report generated following a start of the first display frame period without any intervening touch reports being between generated between the start of the first display frame period and the first touch report; and
    generates a second touch report in the second display frame period, the second touch report generated based on the touch driving signals provided to the touch sensors during the touch frame, the second touch report generated following a start of the second display frame period without any intervening touch reports being between generated between the start of the first display frame period and the first touch report,
    wherein a first time interval between the start of the first display frame period and the first touch report is different than a second time interval between the start of the second display frame period and the second touch report.

4. The touch sensitive display device of claim 1, wherein a touch report rate of the touch driving circuit is non-integer times higher than a frame rate of the display device.

5. The touch sensitive display device of claim 1, wherein the touch driving circuit is configured to further assign at least one dummy touch period to each display frame period, wherein the at least one dummy touch period is positioned between adjacent touch frames.

6. The touch sensitive display device of claim 5, wherein the touch driving circuit:
   supplies a touch driving signal having a first driving frequency to one or more of the touch sensors during a dummy touch period of the first display frame period to obtain a first touch sensing value, the touch driving circuit not producing any touch report based on the touch sensing value obtained during the dummy touch period; and
   changes a driving frequency of the touch driving signal to a second driving frequency different from the first driving frequency responsive to a noise level of the first touch sensing value exceeding a predetermined reference value.

7. The touch sensitive display device of claim 5, wherein the touch driving circuit:
   obtains a first touch sensing value by supplying a touch driving signal having a first driving frequency to one or more of the touch sensors prior to a dummy touch period of the first display frame period, and
   supplies a touch driving signal having a second driving frequency different from the first driving frequency to the one or more touch sensors during the dummy touch period to obtain a second touch sensing value, the touch driving circuit not producing any touch report based on the second touch sensing value obtained during the dummy touch period,
   compares a noise level of the first touch sensing value with a noise level of the second touch sensing value, and
   selects between the first driving frequency and the second driving frequency based on the comparison.

8. The touch sensitive display device of claim 5, wherein the touch driving circuit:
   outputs touch driving pulses and dummy pulses to at one or more of the touch sensors, the dummy pulses having different characteristics than the touch driving pulses and being outputted in the at least one dummy touch period,
   receives a signal from a stylus pen, the stylus pen differentiating between the touch driving pulses and the dummy pulses, the signal from the stylus pen synchronized with the touch driving pulses.

9. A driving circuit for a touch sensitive display device, the touch sensitive display device comprising a display panel comprising a plurality of pixels and a plurality of touch sensors, each touch sensor connected to at least one respective pixel of the pixels, the driving circuit comprising:
   a data driving circuit to drive the display panel in a plurality of successive display frame periods, wherein during each display frame period a respective frame of image data is driven to the pixels; and
   a touch driving circuit to drive touch driving signals to the touch sensors during a touch frame that begins in a first display frame period of the display frame periods and ends in a second display frame period of the display frame periods that immediately follows the first display frame period,
   the touch driving circuit receiving a touch enable signal that repeatedly alternates between a first logic level corresponding to a display period and a second logic level corresponding to a touch period, the touch driving circuit driving the touch driving signals to only a single corresponding row of the plurality of touch sensors every time the touch enable signal is at the second logic level during the touch frame,
   wherein a first time interval required to reach a first initial touch report time of the first display frame period from a start time point of the first display frame period is different from a second time interval required to reach a first initial touch report time of the second display frame period from a start time point of the second display frame period.

10. The driving circuit of claim 9, wherein the touch driving circuit drives touch driving signals to the touch sensors during the touch frame by:
    driving touch driving signals to a first subset of the touch sensors during the first display frame period;
    driving touch driving signals to a second subset of the touch sensors during the second display frame period; and
    generating a touch report describing coordinates of a touch based on the touch driving signals driven to the first subset of the touch sensors during the first display frame period and also based on the touch driving signals driven to the second subset of the touch sensors during the second display frame period.

11. The driving circuit of claim 9, wherein the touch driving circuit:
    generates a first touch report in the first display frame period, the first touch report generated following a start of the first display frame period without any intervening touch reports being between generated between the start of the first display frame period and the first touch report; and
    generates a second touch report in the second display frame period, the second touch report generated based on the touch driving signals provided to the touch sensors during the touch frame, the second touch report generated following a start of the second display frame period without any intervening touch reports being between generated between the start of the first display frame period and the first touch report,
    wherein a first time interval between the start of the first display frame period and the first touch report is different than a second time interval between the start of the second display frame period and the second touch report.

12. The driving circuit of claim 9, wherein a touch report rate of the touch driving circuit is non-integer times higher than a frame rate of the display device.

13. The driving circuit of claim 9, wherein the touch driving circuit is configured to further assign at least one dummy touch period to the each display frame period,
    wherein the at least one dummy touch period is positioned between adjacent touch frames.

14. The driving circuit of claim 13, wherein the touch driving circuit:
    supplies a touch driving signal having a first driving frequency to one or more of the touch sensors during a dummy touch period of the first display frame period to obtain a first touch sensing value, the touch driving circuit not producing any touch report based on the touch sensing value obtained during the dummy touch period; and changes a driving frequency of the touch driving signal to a second driving frequency different from the first driving frequency responsive to a noise level of the first touch sensing value exceeding a predetermined reference value.

15. The driving circuit of claim 13, wherein the touch driving circuit:

obtains a first touch sensing value by supplying a touch driving signal having a first driving frequency to one or more of the touch sensors prior to a dummy touch period of the first display frame period, and supplies a touch driving signal having a second driving frequency different from the first driving frequency to the one or more touch sensors during the dummy touch period to obtain a second touch sensing value, the touch driving circuit not producing any touch report based on the second touch sensing value obtained during the dummy touch period, compares a noise level of the first touch sensing value with a noise level of the second touch sensing value, and selects between the first driving frequency and the second driving frequency based on the comparison.

16. The driving circuit of claim 13, wherein the touch driving circuit:

outputs touch driving pulses and dummy pulses to at one or more of the touch sensors, the dummy pulses having different characteristics than the touch driving pulses and being outputted in the at least one dummy touch period, receives a signal from a stylus pen, the stylus pen differentiating between the touch driving pulses and the dummy pulses, the signal from the stylus pen synchronized with the touch driving pulses.

17. A method of operating a touch sensitive display device, the touch sensitive display device comprising a display panel comprising a plurality of pixels and a plurality of touch sensors, each touch sensor connected to at least one respective pixel of the pixels, the method comprising:

driving the display panel in a plurality of successive display frame periods, wherein during each display frame period a respective frame of image data is driven to the pixels;

receiving a touch enable signal that repeatedly alternates between a first logic level corresponding to a display period and a second logic level corresponding to a touch period; and driving touch driving signals to the touch sensors during a touch frame that begins in a first display frame period of the display frame periods and ends in a second display frame period of the display frame periods that immediately follows the first display frame period, the touch driving signals driven to only a single corresponding row of the plurality of touch sensors every time the touch enable signal is at the second logic level during the touch frame, wherein a first time interval required to reach a first initial touch report time of the first display frame period from a start time point of the first display frame period is different from a second time interval required to reach a first initial touch report time of the second display frame period from a start time point of the second display frame period.

18. The method of claim 17, wherein driving touch driving signals to the touch sensors during the touch frame comprises:

driving touch driving signals to a first subset of the touch sensors during the first display frame period;

driving touch driving signals to a second subset of the touch sensors during the second display frame period; and generating a touch report describing coordinates of a touch based on the touch driving signals driven to the first subset of the touch sensors during the first display frame period and also based on the touch driving signals driven to the second subset of the touch sensors during the second display frame period.

19. The method of claim 17, further comprising:

generating a first touch report in the first display frame period, the first touch report generated following a start of the first display frame period without any intervening touch reports being between generated between the start of the first display frame period and the first touch report; and generating a second touch report in the second display frame period, the second touch report generated based on the touch driving signals provided to the touch sensors during the touch frame, the second touch report generated following a start of the second display frame period without any intervening touch reports being between generated between the start of the first display frame period and the first touch report, wherein a first time interval between the start of the first display frame period and the first touch report is different than a second time interval between the start of the second display frame period and the second touch report.

20. The method of claim 17, wherein a touch report rate of the touch driving circuit is non-integer times higher than a frame rate of the display device.

21. The method of claim 17, wherein at least one dummy touch period is further assigned to the each display frame period, wherein the at least one dummy touch period is positioned between adjacent touch frames.

22. The method of claim 21, further comprising:

supplying a touch driving signal having a first driving frequency to one or more of the touch sensors during a dummy touch period of the first display frame period to obtain a first touch sensing value, the touch sensing value obtained during the dummy touch period not being used to produce any touch report; and changing a driving frequency of the touch driving signal to a second driving frequency different from the first driving frequency responsive to a noise level of the first touch sensing value exceeding a predetermined reference value.

23. The method of claim 21, further comprising:

obtaining a first touch sensing value by supplying a touch driving signal having a first driving frequency to one or more of the touch sensors prior to a dummy touch period of the first display frame period, and supplying a touch driving signal having a second driving frequency different from the first driving frequency to the one or more touch sensors during the dummy touch period to obtain a second touch sensing value, the touch sensing value obtained during the dummy touch period not being used to produce any touch report;

comparing a noise level of the first touch sensing value with a noise level of the second touch sensing value, and selecting between the first driving frequency and the second driving frequency based on the comparison.

24. The method of claim 21, further comprising:

outputting touch driving pulses and dummy pulses to at one or more of the touch sensors, the dummy pulses having different characteristics than the touch driving pulses and being outputted in the at least one dummy touch period, receiving a signal from a stylus pen, the stylus pen differentiating between the touch driving pulses and the dummy pulses, the signal from the stylus pen synchronized with the touch driving pulses.

* * * * *